United States Patent Office 2,723,203
Patented Nov. 8, 1955

2,723,203
OPTICAL FLINT GLASS

Gustav Weissenberg, Marburg (Lahn), Heinz Bredow, Marbach, near Marburg, and Norbert Meinert, Munchhausen, Kreis Marburg, Germany, assignors to Ernst Leitz, G. m. b. H., Wetzlar (Lahn) Germany, a corporation of Germany No Drawing. Application October 1, 1952, Serial No. 312,664

Claims priority, application Germany October 5, 1951

4 Claims. (Cl. 106—47)

Our present invention relates to optical flint glasses of high refractive indices and good values of dispersion (the Abbe number V). These glasses are distinctive in that they are colorless and moreover in that they are not attacked by the atmosphere.

In the literature phosphate glasses are known which are obtained by melting together lead oxide, for example red lead, phosphoric acid and tungsten acid. Phosphate glasses are also known in which lead oxide, phosphoric acid, silica and oxides of the second group of the periodic system are used. The former have not proved resistant to the atmosphere and, in the higher range of refractive indices, are colored. The latter do not attain the refractive range and the dispersion values of the above invention.

In application Serial Number 231,262, filed June 12, 1951, now Patent No. 2,684,304, July 20, 1954, optical flint glasses have been described which possess a good stability, and whose composition enables a partial dispersion to be attained which can not be attained with those hitherto known. The partial dispersion obtainable with these glasses is substantially smaller so that in plotting the Abbe number against dispersion, they depart from a straight line function, whereas in practically all glasses hitherto known this relation is a straight line function. In further development of these flint glasses new combinations have been found whose partial dispersion is again normal but which exhibit especially good refractive indices and dispersions relationship.

We have found that by melting together lead orthophosphate and a glass forming agent such as phosphorus pentoxide ($P_2O_5$) and one or more phosphates of elements of the main or side groups of the second series of the periodic system within a predetermined range, distinctive glasses may be obtained. In the principal and side groups of the second series of the periodic system are included magnesium, calcium, strontium and barium on one side and zinc and cadmium on the other. In further development of the invention's processes it has been found that an addition of niobic (columbium) oxide and tungstic oxide permit a further increase in the refractive index.

We have found that for the stabilization of the glasses a smaller amount of aluminum phosphate or indium phosphate is very advantageous not only in that it increases the chemical stability of the glass but hinders crystallization of the melt during clarification though at lowered temperatures.

It has been found that it is not advantageous to form the orthophosphate by melting lead oxide (PbO) or minium or red lead ($Pb_3O_4$) with ortho phosphoric acid ($H_3PO_4$) for several hours since the long heating which is necessary to bring the reaction completely to lead orthophosphate always results in a reduction so that the glasses become colored. It is proposed that the lead orthophosphate be formed wet as, for example, by a reaction of lead chloride with ammonium phosphate and the resulting lead orthophosphate be used as a charging material for the glasses of the invention. The same holds for the other phosphates which may be used. It is more advantageous to form these in the wet way and finally melt down the reaction product.

On this ground the glasses of the invention are rendered exceptionally stable against the atmosphere since there is substantially no free phosphoric acid in the glass.

In the following tables examples are given of the compositions of the glasses.

Table 1

[In percent by weight.]

| Melt No. | $Pb_3(PO_4)_2$ | $Ca(PO_3)_2$ | $Na_3AlF_6$ | $n_D$ | V |
|---|---|---|---|---|---|
| M279 | 94.3 | 4.7 | 1 | 1.797 | 31.2 |
| M280 | 90.1 | 9.0 | 0.9 | 1.773 | 32.6 |

Table 2

[In percent by weight.]

| Melt No. | $Pb_3(PO_4)_2$ | $Ca(PO_3)_2$ | $InPO_4$ | $n_D$ | V |
|---|---|---|---|---|---|
| E286 | 87.0 | 8.7 | 4.3 | 1.766 | 33.6 |
| E287 | 83.4 | 8.3 | 8.3 | 1.7725 | 28.4 |
| E288 | 77.0 | 7.7 | 15.3 | 1.757 | 33.9 |
| E289 | 71.5 | 7.2 | 21.3 | 1.749 | 35.0 |
| E290 | 62.4 | 6.3 | 31.3 | 1.756 | 34.2 |
| E291 | 54.1 | 5.4 | 40.5 | 1.752 | 34.8 |
| E292 | 47.6 | 4.8 | 47.6 | 1.696 | 41.6 |

Lead orthophosphate may be used from 47.6% to 94.2% by weight with from about 4.7% to 9% by weight of at least one metaphosphate of at least one element of the second group of periodic system consisting of magnesium, calcium, strontium, barium, zinc and cadmium, and with from zero to approximately 47.6% by weight of indium phosphate.

It is to be understood that to the compositions, chemically and physically stabilizing substances such as silica ($SiO_2$), aluminum oxide ($Al_2O_3$), or decolorizing agents such as arsenic trioxide ($As_2O_3$) or the like may be added.

The glasses are melted in a range between 1100° C. and 1250° C. preferably in a platinum crucible. It has been found that by using the purest phosphates the platinum crucible is not attacked. Most of the glasses may be pressed in a range of from 500° C. to 550° C.

Having described our invention, what we claim is:

1. Optical flint glass consisting essentially of a melt of from about 47.6% to 94.2% by weight of lead orthophosphate, from about 4.7% to 9% by weight of at least one meta phosphate of at least one element of the second group of the periodic system consisting of magnesium, calcium, strontium, barium, zinc and cadmium, and indium phosphate from zero to approximately 47.6% by weight.

2. The optical flint glass of claim 1 in which the lead orthophosphate is in a range of from about 47.6% to 87% by weight and the indium phosphate is in a range of from about 4.3% to 47.6% by weight.

3. The optical flint glass of claim 1 in which the phosphate of an element of the second group of the periodic system is calcium phosphate.

4. The optical flint glass of claim 1 which contains approximately 1% sodium aluminum fluoride.

References Cited in the file of this patent

UNITED STATES PATENTS

| 1,654,404 | Blumenberg | Dec. 27, 1927 |
| 2,518,194 | Silverman | Aug. 8, 1950 |

FOREIGN PATENTS

| 585,257 | Great Britain | of 1947 |

OTHER REFERENCES

Sprechsaal: August 15, 1918, pp. 149–150.